July 10, 1973 G. E. KAYE 3,745,049
ELECTRICALLY COMMUTATING BATTERY CASES
Filed April 23, 1971 2 Sheets-Sheet 1

INVENTOR.
Gordon E. Kaye
BY
ATTORNEY

July 10, 1973   G. E. KAYE   3,745,049
ELECTRICALLY COMMUTATING BATTERY CASES
Filed April 23, 1971                           2 Sheets-Sheet 2

United States Patent Office 3,745,049
Patented July 10, 1973

3,745,049
ELECTRICALLY COMMUTATING BATTERY
CASES
Gordon E. Kaye, Irvington, N.Y., assignor to P. R.
Mallory & Co., Inc., Indianapolis, Ind.
Filed Apr. 23, 1971, Ser. No. 136,944
Int. Cl. H01m 1/02
U.S. Cl. 136—173                14 Claims

ABSTRACT OF THE DISCLOSURE

A combination battery cell holder and switch in which a stack of one or more cells is disposed co-axially in a rotary cylindrical case having two windows through which the cell surfaces of opposite polarities may be engaged or disengaged by two contacts external of the case and supported in a housing that also encloses and supports the case for angular motion to close or to open the circuit between the contacts and the cell surfaces.

---

This invention relates to a battery cell and switch combination structure in which the casing or container for the cell is arranged to actuate the cell to act as an element of the switching device.

There are many applications for electric cell batteries where the cells are used in miniaturized form, in order to occupy a minimum of space. One important application for such miniaturized cells is in hearing aids. In such devices, and, in fact, in most devices that utilize electric cells, it is customary to provide an independent switch to connect the electric cell or cells to an external circuit, or to disconnect such cell or cells from such external circuit. An independent switch when provided for this purpose usually requires considerable space, and assembly labor, with corresponding cost.

The primary object of this invention is to provide an economical construction including a control switch and a cell stack, of one or more cells, with the combination so constructed as to enable and permit the cell stack to be utilized in part as an element of the switching means for controlling the connection of the cell to an external circuit.

One of the features of the invention and a primary purpose of the invention is to provide a construction in which the cell is mounted in a case to be actuable, here rotatable, with the case in such manner as to move the cell into or out of engagement with an external contact member associated with an external circuit.

Other objects and features of the invention are to provide a design construction which permits a battery cell and case to be easily assembled, to enclose one or more cells as a stack, so the assembled cell case can be inserted into a housing chamber, with contacts disposed in the housing to engage areas of opposite polarity on the cells in the stack, to provide the desired voltage from the cell stack to an external circuit, with the construction and disposition of the cell case within the housing being such that the cell case may be angularly rotated within the housing from a circuit closing position to a circuit opening position, and reversely, from open circuit position to circuit closing position.

The principles of operation and the construction of the cell and switch combination are explained in more detail in the the following specification, taken together with the accompanying drawings, in which.

Figure 1:
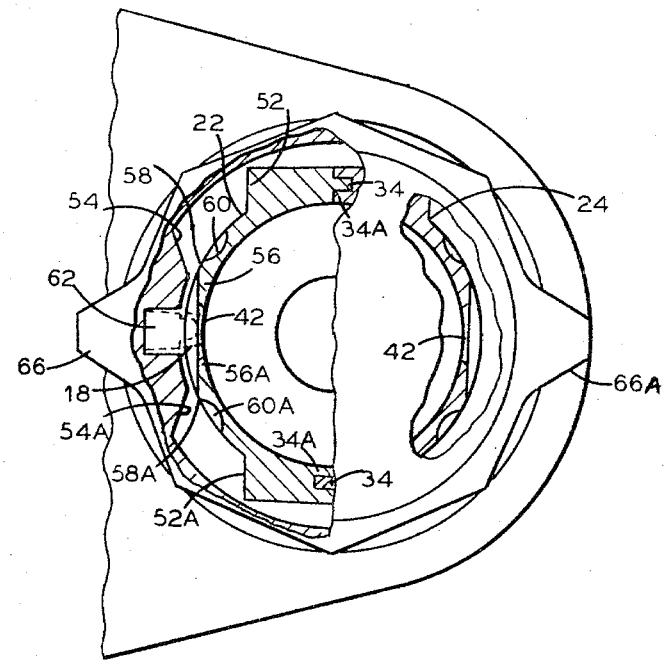
FIG. 1 is a vertical view, partially in section and partially in elevation of the combination battery-switch structure.

As generally shown in the drawings, the invention consists of a double half-shell cylindrical hollow case for receiving and concentrically holding a cell stack containing one or more electric cells, and consists, further, of a housing for receiving and supporting the case and the cells, concentrically, on a mutual axis, for angular movement of the case and cell stack, within and relative to the housing, to enable angular movement of the stack to make and break engagement with a switch contact disposed within the housing, whereby the total cell and switch srструктure is economical in cost, simple in construction, and effective in operation, within a minimum of space, for possible use with devices of desired small dimensions, particularly hearing aids.

Figure 2:
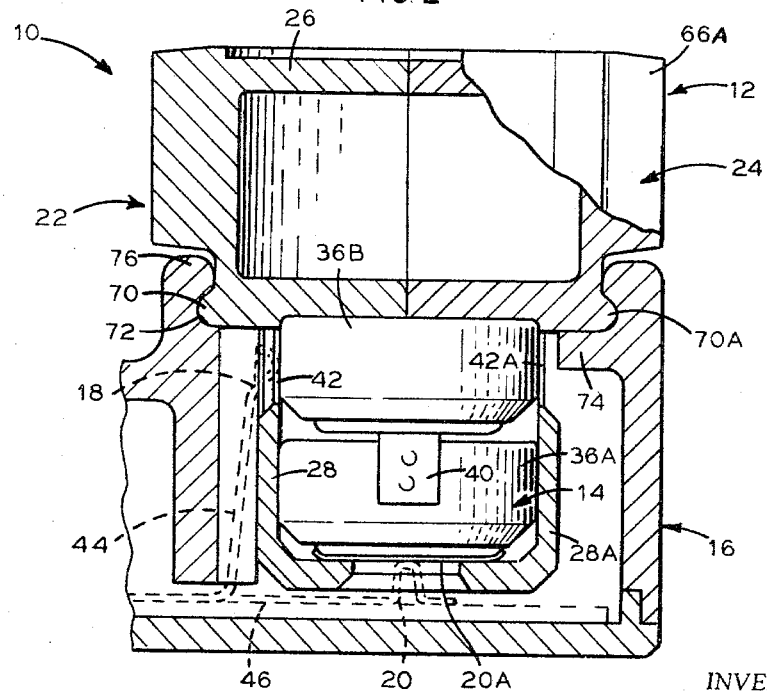
FIG. 2 is a transverse sectional view, looking downward, and shown partially in elevation and partially in plan of the battery-switch device of FIG. 1.

As generally shown in FIG. 2, a battery and switch combination device 10, constructed to embody this invention, comprises a battery cell case 12, for holding a cell stack 14, with the case and cell stack constituting a unitary structure that is rotatably supported on, and in, a housing 16 which serves to hold two switch contacts 18 and 20 in appropriate positions to engage two surfaces of opposite polarity on the cell or cells in the cell stack 14, to provide the cell voltage to an external circuit.

Figure 3:
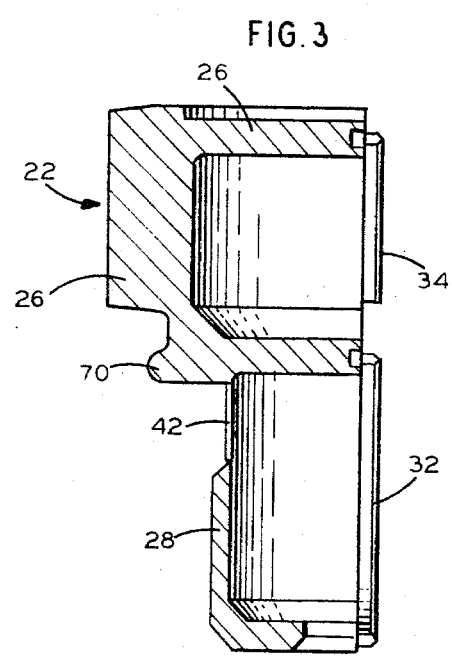
FIG. 3 is a vertical sectional view of a half-shell of the case for the cell stack.
Figure 4:
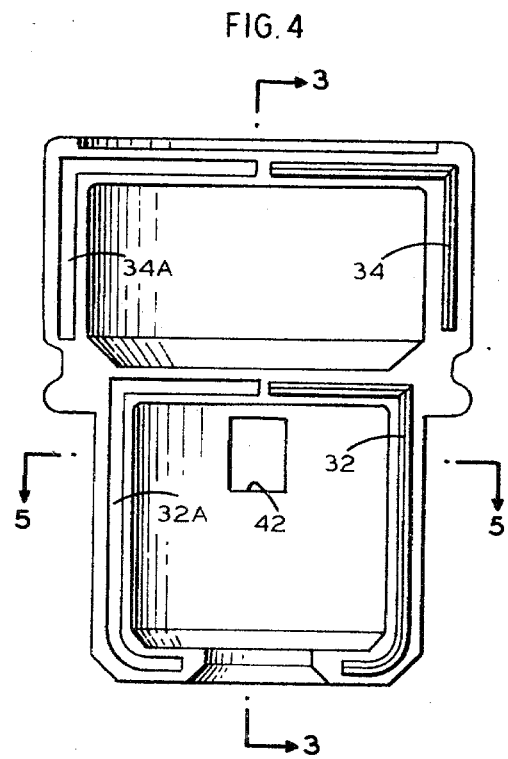
FIG. 4 is an elevational view of the half-shell of FIG. 3 looking into that half-shell.

The battery case 12 consists of two half shells 22 and 24, shown in more detail in FIGS. 3 and 4, respectively, and the half shell 22 embodies a hollow semi-cylindrical head section 26 and a semi-cylindrical downwardly extending body section 28, substantially closed at its lower end. The two half shells 22 and 24 are provided with pilot ribs 32 and 34 and receiving and positioning fluted grooves 32A and 34A disposed on opposite half shell edge faces so the two half shells may be properly fitted and mated, and then suitably joined and sealed, after a stack of cells, and such as the two cells 36A and 36B are assembled in place within the two hollow semi-cylindrical extending body sections 28 and 28A are coupled and closed around the cells of the stack, here shown as two, by way of example.

Before assembling the two electric cells 36A and 36B in their case including the two half shells, the two electric cells are appropriately electrically coupled by an electrical conducting strip 40 which is welded to an inner axial terminal of the top cell 36B and spot welded, as shown, to the surface of the external can of the lower cell 36A to establish a series electrical connection between the two cells.

As shown in FIGS. 1 and 2, each half shell 28 and 28A is provided with a window 42, to provide access for the switch contact 18 to engage the surface of the cell 36B when the cell and its case are rotated to a position as shown in FIG. 2, where the window 42 is aligned with the switch contact 18. The switch contact 18 is supported as a cantilever at the free end of a metallic conductor 44 which leads to an external circuit that is to be energized from the cells in the stack. The window 42 on the opposite half shell serves to provide access for the switch contact 18 if the cell stack case 12 and the housing 16 are assembled with the window 42A in position to engage the switch contact 18. The other switch contact 20, previously referred to, is supported in the housing 16 to be coaxially disposed relative to the cell stack, so that the terminal surface of opposite polarity in the cell stack will be engaged to provide a connection through a conductor 46 to the external circuit to be energized from the cell stack.

As shown in more detail in FIG. 1, the half shell 22 is provided with two external axially disposed shoulders 52 and 52A which serve as stops against a buttress surface 54 and 54A on the inside surface of the cylindrical wall of the housing 16, so the case containing the stack of cells may be angularly turned through a limited angle in either direction, from the neutral "On" position with the switch contact 18 engaging the surface of the outer can of cell 36B, to an "Off" position at which the switch contact 18 is held out of contact from the cell 36B to open the circuit between switch contact 18 and the cell stack. As previously mentioned, the switch contact 18 is mounted at the free end of the cantilever conductor 44. When the case 12 of the cell stack is turned angularly to open the circuit, two tapered body portions 56 and 56A on opposite sides of the window 42 provide two opposite wedge-shaped lifting fingers to slide under the switch contact 18 so that contact 18 may rise radially away from contact surface of the cell 36B with a minimum side thrust against the switch contact 18 until the peak 58 or 58A of that wedge 56 or 56A is reached. Each wedge 58 and 58A embodies a cavity 60 and 60A, respectively. The additional permitted angular movement of the case 14, according to direction, moves the small cavity 60 and 60A into posiiton under the cantilever switch contact 18 to provide a recess into which that switch contact 18 may drop. The function of the two cavities 60 and 60A is double. First, the stress on the cantilevered switch contact 18 is reduced in the "Off" position, to keep the accumulated stress in the supporting conductor 44 below the bending stress and fatigue limit. Second, the additional function of each cavity 60 and 60A is to serve with the switch contact 18 as a detent to prevent any casual displacement of the cell case from "Off" position to "On" position to establish a connection to the external circuit, when not so desired.

An additional feature of the invention is the provision of the buttress 54 to provide a retraction space 62 into which the switch contact 18 may readily move radially in or out, during operation of the switch between "On" and "Off" positions.

In order to provide for easy operation, or easy angular movement of the cell case 12 within the housing 16, the head 26 of the cell case is provided with one or more peripheral bosses 66 and 66A, by means of which the case may be easily turned, to easily affect the switching operation.

Reverting to FIG. 2 each of the half shells of the case is shaped to embody a peripheral semicircular ring 70, and 70A, in a transverse plane, so mutually positioned on each shell as to be correctly aligned to mate and to constitute a continuous peripheral circular ring, to fit into a continuous internal circular groove 72 near the top of the opening of the housing structure 16. The switching case 12 is thus supported for angular movement to open or to close the circuit, between switch contact 18 and the cell can, as shown in the structure illustrated in more detail in FIG. 1. Just under the circular groove 72 of the housing 16, a shelf 74 is provided that constitutes an arcuate seating segment for the case 12 that extends only partially around the body of the housing 16. The housing further embodies a circular retaining head ring 76 as an extension and superposed closure for the groove 70, in order to hold the cell case against casual undesired displacement and separation from the housing.

Figure 5:
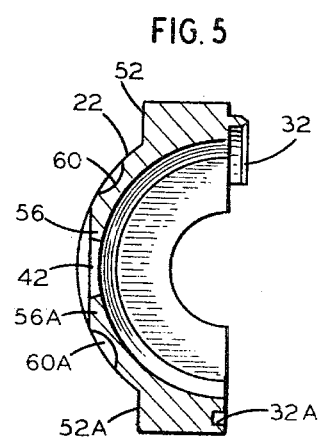
FIG. 5 is a sectional view taken along the line 5—5 of FIG. 4 looking downward on the half-shell structure of FIGS. 3 and 4.

The two half shells of the cell case 12 are fitted together in proper positioning controlled by the pilot ribs 32 and 34 of FIG. 4, and are further indicated in the sectional view of FIG. 5 where those pilot ribs and receiving cavities are indicated.

To avoid the effect of accumulated and excess stresses on the central axial electrode of the bottom cell 36A of the cell stack, the bottom contact 20 is provided with a saucer-shaped top element 20A to absorb frictional stress imposed by the electrode terminal 20 on the central axial electrode of cell 36A.

The battery switch and holder case is formed of an inexpensive plastic material which permits the entire cell and switch case to be discarded when the energy from the cell stack has been completely withdrawn.

By means of the construction shown herein, the combination battery cell and switch can be formed as an inexpensive self-contained power control unit, with small dimensions to provide a combination to fit in limited spaces for hearing aids, where frequent operation of the cell switch circuit is desirable. The space required is relatively small, and the construction permits efficient operation with effectiveness over a relatively long operating period. Moreover, the construction of the head of the cell holder 12 is such as to permit simple operation in either direction by an elderly person or person with arthritic hands.

A simple construction of the invention has been illustrated, and the details of the construction may be varied without departing from the spirit and scope of the invention as set forth in the claims.

What is claimed is:

1. A combination electric cell battery and switch, comprising
   a case to receive and enfold an electric battery cell stack peripherally, at least partially, with the stack consisting of one or more cells disposed co-axially relative to a vertical axis, said case consisting of two semicylindrical half-shells to be fitted together to enfold the cell stack cylindrically;
   one of said half-shells having a window in its semicylindrical wall to expose a limited area of a cell in said shell, and each of said half-shells having a semicircular opening disposed at said axis so both will constitute a full circular opening jointly when both shells are assembled and fitted together, such full circular opening serving as a window through which an external second circuit contact element may extend to engage the adjacent surface area of a cell in place in operative position in the shell, so the cell may be electrically related to an external circuit;
   means for supporting said case and cell stack for limited angular movement about said vertical axis of said cell stack;
   and switch means including a first contact element normally biassed to engage a first terminal surface of said cell stack; with said contact element being responsive to and controlled by movement of said case and being operative to engage and to disengage said terminal surface of said cell stack in response to such movement of said case.

2. A combination electric battery and switch, as in claim 1, in which said switch means includes a second contact terminal element for engaging a second terminal surface of said cell stack in all angular positions of said case.

3. A combination electric battery and switch, as in claim 1, in which
   said case is provided with a peripheral opening through which said first switch contact element may extend to engage said cell surface, and said case is further provided with end stops at each side of said opening to limit angular movement of said cell surface around said axis.

4. A battery cell and switch combination, as in claim 1, wherein said means for supporting said case and cell stack comprises an outer housing for supporting said case for relative angular movement about said axis, and said housing serves also to support said first contact element.

5. A battery cell and switch combination, as in claim 4, in which
   said housing embodies a cylindrical ring wall defining a substantially circular chamber therein, to receive said case with the cell stack;
   means on said housing for supporting said case and cell stack for angular movement and for limiting such angular movement to either side from a central active position.

6. A battery cell and switch combination, as in claim 5, in which
said housing ring wall embodies an inner boss to serve as a stop for said cell case to limit the angular movement permitted to said cell case.

7. A battery cell and switch combination, as in claim 6, in which
said inner boss is shaped with two side wings and a middle space;
and said first contact element of claim 1 is supported as a cantilever with its free end biassed to radially engage said first terminal surface of said cell stack, and said free end being disposed for permitted radial movement in said middle space between the two side wings, and said side wings serving to prevent angular or twisting side movement of said contact element in response to side thrust component of force generated by said case when moved angularly to move said contact element to or from engagement with said cell stack.

8. A battery cell and switch combination, as in claim 7, in which
said case is provided with rest cavities for said switch contact element to permit said switch contact element to return to an insulated position of minimum bias stress after being moved from contact with the cell stack.

9. A battery cell and switch combination, as in claim 8, in which
said case embodies an outer co-axial ring with radial actuating element for angularly moving said case to control the position of said first contact element.

10. A combination battery cell and switch comprising
a stack of one or more electric battery cells disposed co-axially relative to a vertical axis;
and a plastic case enclosing said stack, said case consisting of two semi-cylindrical half-shells to be fitted together to form a hollow cylindrical body co-axially surrounding said stack, with two end closure walls at the ends of said cylindrical body to hold the stack against relative movement, said plastic case having a window opening in the cylindrical body to provide access to a surface of a cell at one end of said stack to derive a potential of one polarity from said stack of cells, and said plastic case having a window in one end closure to provide access to a cell surface at the opposite end of said stack to derive a potential of opposite polarity for an external circuit;
and a housing having a chamber to receive said case, and having two contact terminals supported in positions to enter said two windows in said case to engage said two areas of opposite polarities to provide a voltage to an external circuit.

11. The combination as in claim 10, in which
said housing is hollow and has an internal chamber surrounded by a circular seating shoulder to support said case for relative angular movement, when said case is inserted into said chamber, and said housing embodying a retaining ring to hold said case during such angular movement.

12. A combination electric cell battery and switch comprising a housing structure; a snap-in control switch electric cell case within said housing; one or more cells contained within said cell case; said cell case comprising two half shells sealed together; said seal being along the intersection of pilot ribs nested into receiving and positioning fluted grooves, said ribs and grooves disposed on opposite half shell edge faces for properly aligning and mating together the two half shells; each half shell of said cell case comprising a hollow semi-cylindrical head section integrally formed to a hollow semi-cylindrical downwardly extending body section; said head section provided with a peripheral boss by means of which the cell case may be easily turned to affect the switching operation; said downwardly extending body section provided with a window for providing access for a first switch electrical contact to contact a cell terminal; this first electrical contact being supported as a cantilever at the free end of a metallic conductor; said body section having bottom end walls with an opening therein that is closed by a saucer-shaped metallic top that electrically connects a second switch electrical contact with an opposite cell terminal.

13. The combination electric cell battery and switch, as in claim 12, in which the housing structure further comprises a buttress having a retraction space into which the first switch contact moves radically in or out and also having a buttress surface on each side of said space on the inside surface of the housing wall; each half shell being provided with two external axially disposed shoulders which serve as stops against said buttress surfaces to limit the angular displacement of the cell case; each half shell having two tapered body portions on opposite sides of the window to provide two opposite wedge-shaped lifting fingers to slide under the first switch contact and raise said first contact radically away from the cell terminal until the peak of said wedge is reached; each wedge embodying a cavity adjacent said finger and angularly movable into position under the cantilever switch contact to provide a recess into which the switch contact drops after reaching the peak of said wedge.

14. The combination electric cell battery and switch, as in claim 13, in which the cell case further comprises a continuous peripheral circular ring; the housing structure having a continuous internal circular groove near the top of the opening thereof; said ring being fitted into said groove; a shelf under the circular groove of the housing constituting an arcuate seating segment for the cell case; positioned above said circular groove there being a circular retaining head extension and superposed closure for the groove to hold the cell case against casual undesired displacement and separation from the housing.

References Cited

UNITED STATES PATENTS

| 2,916,538 | 12/1959 | Rose | 136—173 |
| 3,220,888 | 11/1965 | Moore et al. | 136—173 |

FOREIGN PATENTS

| 93,522 | 3/1959 | Denmark | 136—173 |

DONALD L. WALTON, Primary Examiner